APPARATUS FOR THE FORMATION OF HELICAL PLASTIC PIPE

Filed March 10, 1970 2 Sheets-Sheet 1

INVENTOR.
HERBERT TALSMA
BY John F. Jones
ATTORNEY

Oct. 19, 1971 H. TALSMA 3,613,162

APPARATUS FOR THE FORMATION OF HELICAL PLASTIC PIPE

Filed March 10, 1970 2 Sheets-Sheet 2

INVENTOR.
HERBERT TALSMA

BY *John F. Jones*

ATTORNEY 3,613,162

APPARATUS FOR THE FORMATION OF HELICAL PLASTIC PIPE

Herbert Talsma, East Cleveland, Ohio, assignor to The Standard Oil Company, Cleveland, Ohio Filed Mar. 10, 1970, Ser. No. 18,213
Int. Cl. B29d 23/04
U.S. Cl. 18—14 RR 3 Claims

ABSTRACT OF THE DISCLOSURE

Plastic resin is extruded over a rotatable cooling mandrel in a die assembly which is disposed upon the barrel of an extruder. A rotatable die bushing embraces the end of the mandrel; when the die bushing is rotated in unison with the mandrel in a direction counter to that imparted the extrudate by the helix, an extrudate with no net rotation is produced.

BACKGROUND OF THE INVENTION

This invention relates to a process for the continuous extrusion of a plastic resin into a helical tubular or pipe shape, and to a novel die assembly which is particularly concerned with the relationship of the rotatable parts thereof to the barrel of the extruder upon which said die assembly is disposed. The instant invention permits the manufacture of helical tubular shapes from thermoplastic material such as polyolefins, polyvinyl chloride, polystyrene and the like, as well as extrudable thermosetting resins such as phenolic resins and amino resins including melamine resins, by a simple extrusion apparatus requiring only conventional specifications as to pressure and temperature. The instant die assembly is easily affixed to the barrel of a conventional extruder, without modifying it substantially, and permits the replacement of the mandrel and die bushing for maintenance, or for a change in diameter of pipe without substantially interrupting the operation of the extrusion machine. This effects material saving in time as well as precluding the loss of much valuable plastic resin, which often has to be scrapped, following the usual machine shutdown which accompanies a changing of or removal of the die. A particular advantage of the instant invention is that it is possible to make large diameter helical plastic pipe using a small extruder.

It is well-known that indentations, undulations, ribs, and the like serve to rigidify tubular shapes. A common method of rigidifying plastic pipe is to provide corrugations in the wall of the pipe in such a manner that the wall of the pipe consists of a series of circumferential ribs alternating with troughs, that is, corrugations which are a series of discrete, alternating ridges and grooves transversely disposed along the longitudinal axis of the pipe. This corrugation of the pipe predictably adds considerable strength to the pipe, thus permitting the manufacture of pipe with high transverse crushing strength, at the same time using substantially less material than would otherwise be necessary to provide the same strength with cylindrical pipe having smooth walls.

The process of the instant invention permits the formation of pipe having a helical wall, that is, the wall of the pipe consists of a continuous helix. Bulk plastic pipe is usually shipped and stored in considerable lengths in the form of coils. The advantage of a helical pipe is that, in addition to providing the extra transverse crushing strength utilizing much less material than would be necessary in smooth-walled, cylindrical pipe of comparable strength, it is capable of making tighter bends, permitting it to be rolled into tighter and more compact coils which makes shipping and storage of the pipe more economical.

The fact that it can bend more easily than "corrugated" pipe provides the real advantage of helical pipe. Thus, not only can tighter rolls be formed, but when it is unrolled for use as conduit it may be bent into tighter bends, permitting it to be used under conditions where smooth or "corrugated" pipe would have to be cut and fitted with an elbow or other fitting.

It will be apparent that, though the instant apparatus is particularly useful in the manufacture of helical pipe, it can also be used for the manufacture of smooth-walled, cylindrical pipe, with the advantage that the die bushing forming the outer wall of the pipe may be counter-rotated relative to the mandrel forming the inner wall of the pipe, thus providing orientation of the molten synthetic resin in the hoop direction. It will be recognized that in conventional extrusion of cylindrical pipe the orientation is linear and is substantially uncontrolled. By providing orientation in the hoop direction, this predominantly linear orientation of conventional cylindrical pipe can be eliminated and advantage can be taken of all the reinforcing potential of molecular orientation.

SUMMARY

An object of the instant invention is to provide a rotatable mandrel in a die assembly, which can be easily assembled and mounted onto the barrel of a conventional extruder for plastic material, so as to enable one to form a continuous tubular plastic shape with a helical wall.

Another object of the instant invention is to provide a pipe-die assembly for continuously making helical plastic pipe, said die assembly having parts interchangeable on the extruder, for varying pipe diameters and for varying pitches of the helix desired to be incorporated into the wall of the pipe.

It is still another object of the instant invention to provide a rotatable internally cooled mandrel which is rotated in conjunction with a rotatable die bushing in such a manner as to provide a continuous helical extrudate of plastic resin.

It is a further object of the instant invention to provide a continuous helical extrudate with no net rotation by counter-rotating the die bushing and mandrel, which are locked in position relative to each other, relative to the direction of rotation imparted to the extrudate by the helical mandrel, in such a manner that there is no net rotation on the extrudate, permitting the extrudate to be coiled in any predetermined lengths.

DRAWING

FIG. 1 is a cross-sectional view of the die assembly. Extruded helical plastic pipe emerges from the front (or left hand end of FIG. 1). Mounting means are provided to permit the die assembly to be locked onto the barrel of any conventional extruder.

PREFERRED EMBODIMENT OF THE INSTANT INVENTION

Figures 1, 2:
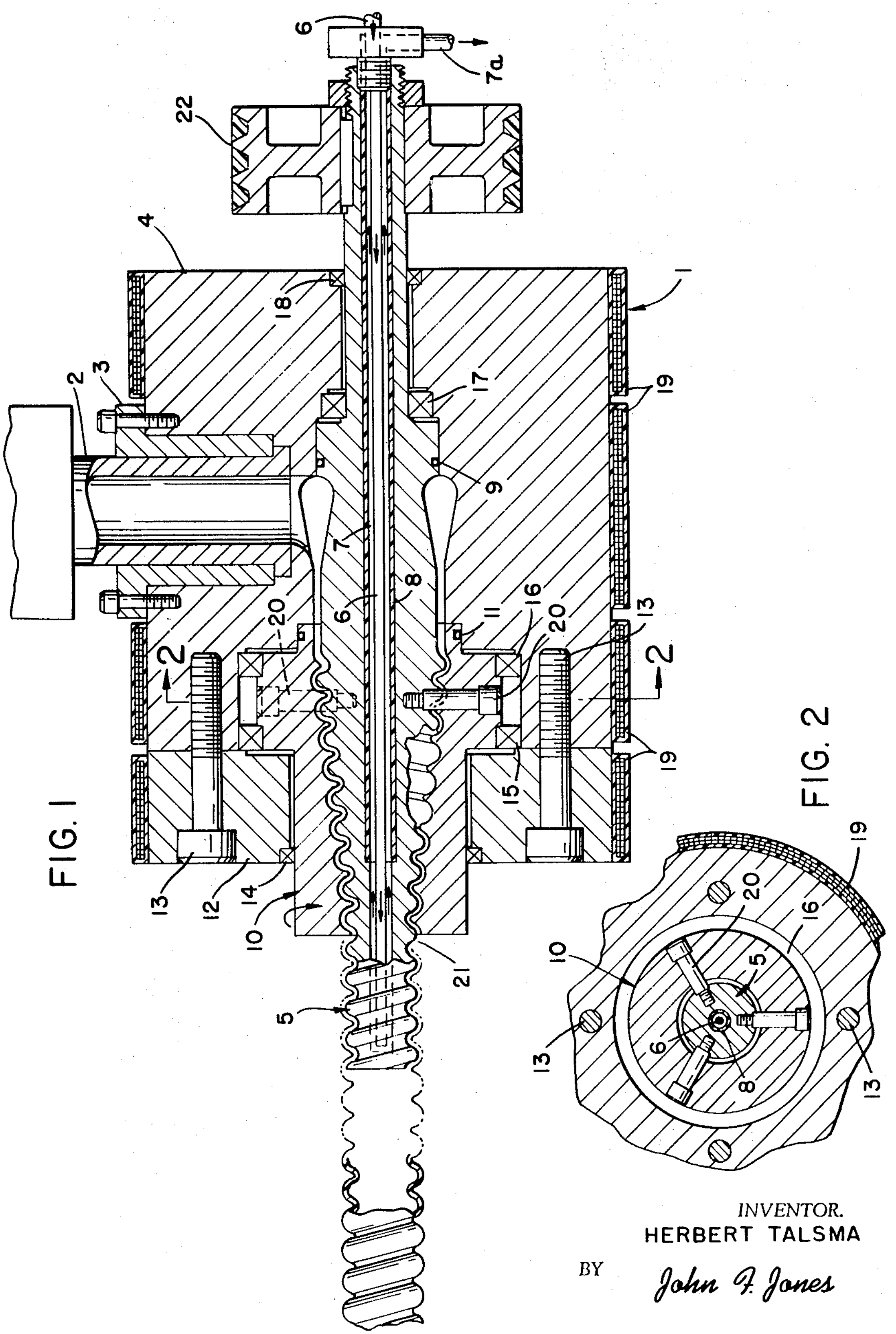
FIG. 2 is an end cross-sectional view showing the mandrel and die bushing locked so as to rotate in unison.
Figure 3:
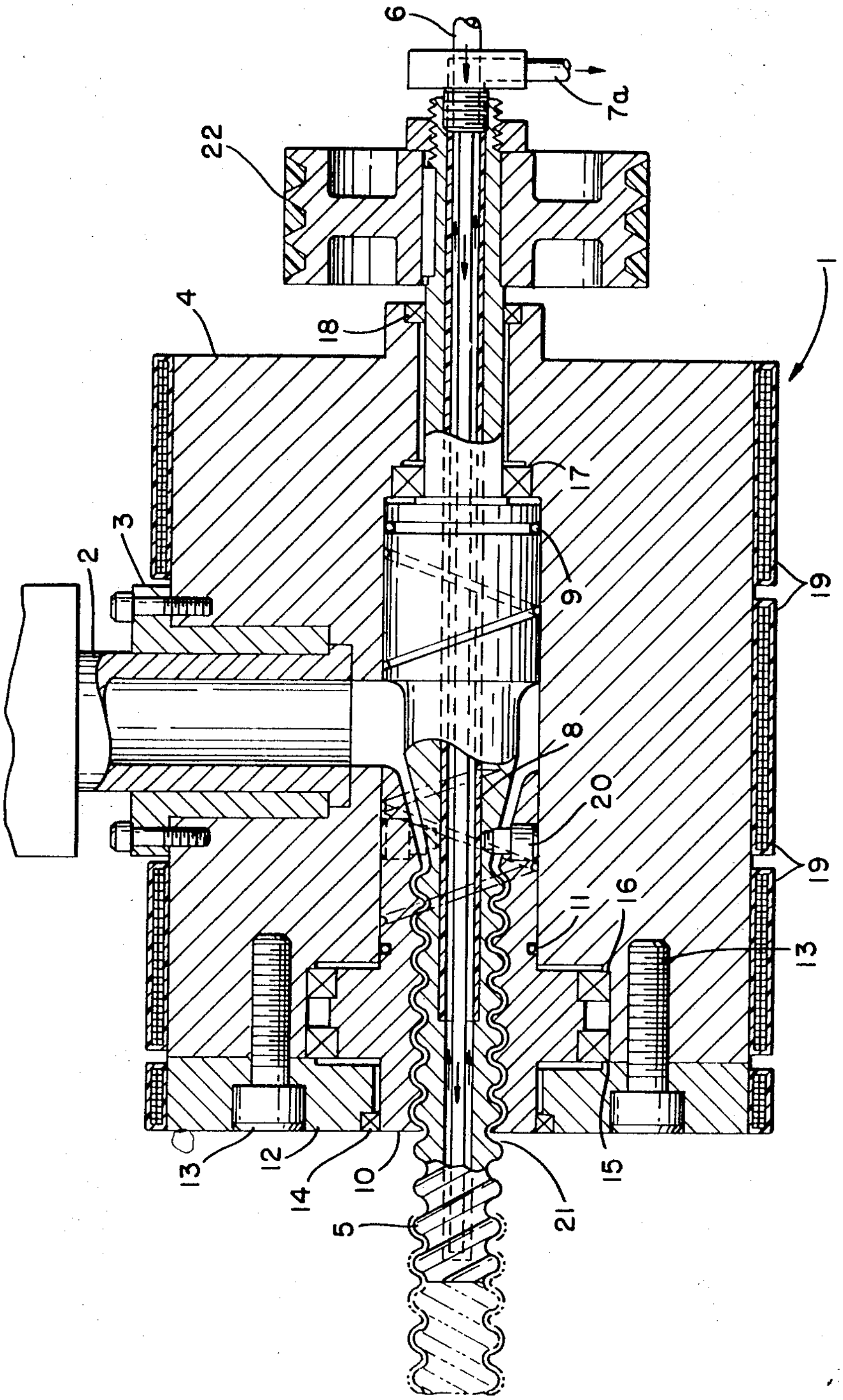
FIG. 3 is a cross-sectional view of another embodiment of the die assembly.

Referring again to the figures, the die assembly indicated generally at 1 is fixedly disposed onto the barrel of an extruder 2. This may be accomplished by a locking collar 3 which is locked onto the barrel 2 of the extruder. The body 4 of the die is fixedly disposed in relation to the barrel 2 of the extruder by being locked onto the locking collar 3. A mandrel 5 is centrally disposed axially within the body 4 of the die. The mandrel 5 has a passage axially disposed within it for the purpose of providing a coolant fluid to the end of the mandrel. This is done by providing a passage that will accommodate annular tubes 6 and 7, the inner annular tube 6 being longer than the exterior tube 7, the end of the interior tube 6 extending to the tip of the mandrel 5. The exterior tube 7 is provided with an insulative sheath 8. The remainder of the mandrel is insulated from the cooling means by an insulative material shown at 8. The mandrel 5 is equipped with a rotary seal 9.

A rotatable die bushing 10 with a helix to match the helical grooves on the mandrel 5, taking into account the thickness of the pipe wall desired, is disposed about the mandrel 5 and is equipped with a rotary seal 11 disposed within the body 4. A locking ring 12 is bolted onto the body 4 of the assembly by the bolts 13. A groove on the inner face of the locking ring 12 snugly accommodates a bearing 14. Bearings 15 and 16 are provided between the die bushing 10 and the die body 4. Other bearings 17 and 18 are provided between the mandrel 5 and the die bushing 4.

A tube 6 is disposed axially within the mandrel 5. The tube provides a means for supplying cool fluid coolant to the tip of the mandrel which, upon absorbing heat from the hot thermoplastic resin, exits at *7a*. Band heaters shown at 19 are normally used on the die assembly to maintain the temperature of the thermoplastic resin.

Referring now to FIG. 2, which is a cross-sectional end view taken through 2—2 in FIG. 1, it will be seen that the mandrel 5 is fixedly located by bolts 20. Centrally disposed within the mandrel are annular tubes 6 and 7 and an insulative material 8 which sheathes the outside surface of the exterior annular tube 7.

In the production of helical pipe, the hot, plastified thermoplastic resin is extruded from the barrel 2 of the extruder between the mandrel 5 and the body 4. It flows into the zone between the mandrel 5 and the die bushing 10 and emerges as helical pipe at 21, at which point it has already begun to be cooled. Further cooling of the helical pipe is accomplished on the tip of the mandrel, and still further external cooling may be required. Whenever the mandrel and the die bushing are held stationary and not rotated, the helical extrudate emerges rotating in the direction predicated by the helix and, because of this rotation, cannot be coiled upon itself. However, when the instant rotating die-mandrel apparatus is used for the production of smooth-walled, cylindrical pipe wherein the smooth surface of the die bushing and the mandrel define a tapered cylindrical zone, there is no net rotation of the emerging pipe. The combined mandrel and die bushing are rotated by driving means 22.

When helical pipe is to be produced in coils, it is imperative that the net rotation of the pipe emerging from the die be 0. To accomplish this, the die bushing, which is locked to the mandrel, is rotated in unison with the mandrel at such a rate as to negate the rotation imparted to the extrudate by the helix.

I claim:

1. Extrusion apparatus for continuously extruding plastic material in a helical configuration in conjunction with a die assembly comprising in combination:

(a) a die body fixedly disposed upon the barrel of an extruder, (b) a mandrel rotatably disposed within said die body, said mandrel having helical configurations, and an axial passage to provide coolant to the end of said mandrel, (c) a rotatable die bushing fixedly disposed in relation to said mandrel, said die bushing having matching helical configurations in spaced-apart relationship from the mandrel so as to provide a helix-forming zone forming a helical extrudate which emerges over the end of said mandrel and is cooled thereby, (d) a locking ring to position the die bushing relative to the mandrel and to prevent any lateral or vertical movement thereof relative to the die body, and (e) means for rotating said mandrel.

2. The apparatus of claim 1 wherein band heaters are provided over said die body.

3. The apparatus of claim 1 wherein rotary seals are provided between said die lip and said body.

References Cited

UNITED STATES PATENTS

| | | | |
|---|---|---|---|
| 3,292,213 | 12/1966 | Donald et al. ______ | 18—14 RR |
| 2,801,441 | 8/1957 | Wadsworth ________ | 18—14 RR |

J. SPENCER OVERHOLSER, Primary Examiner

D. S. SAFRAN, Assistant Examiner

U.S. Cl. X.R.

18—13 RR, 12 DR